No. 735,626.

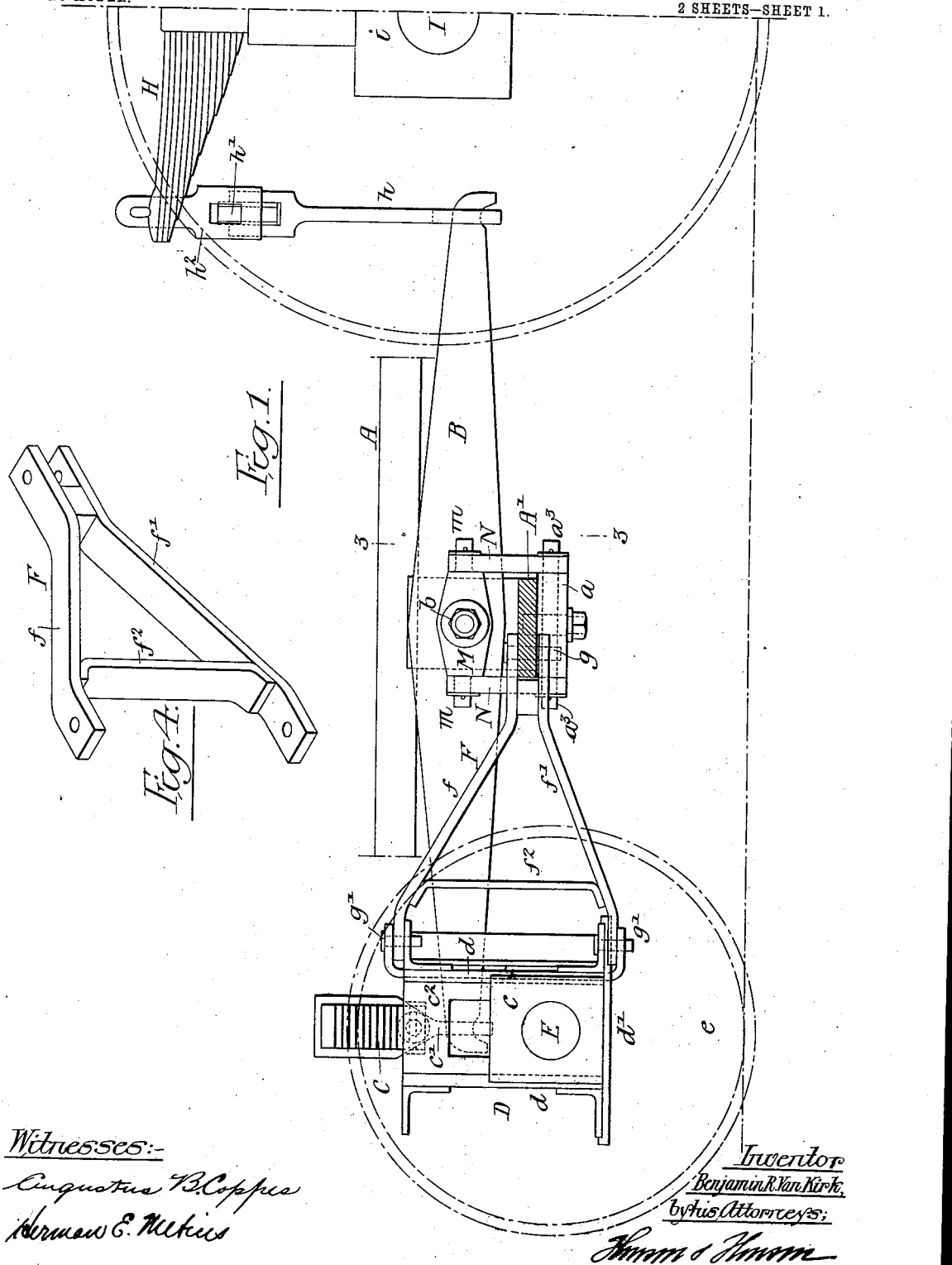

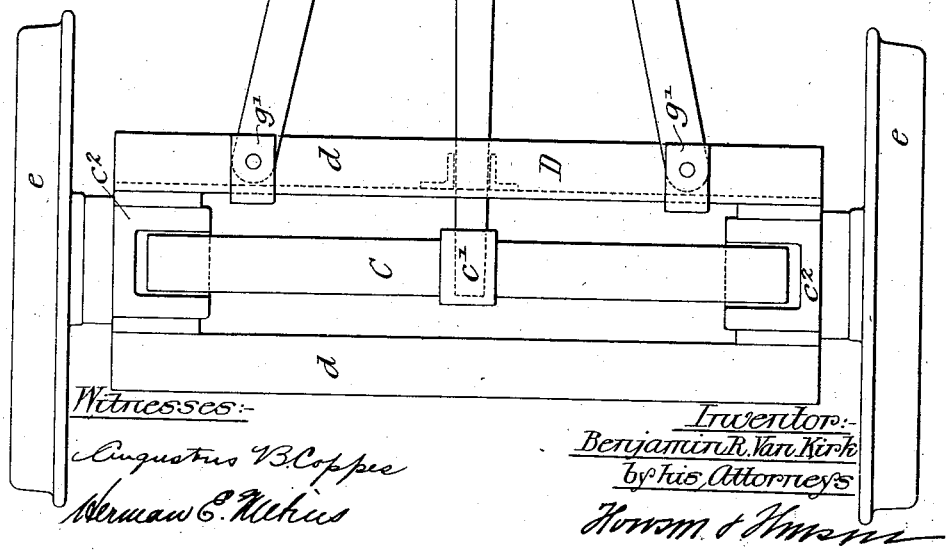

Patented August 4, 1903.

UNITED STATES PATENT OFFICE.

BENJAMIN R. VAN KIRK, OF PHILADELPHIA, PENNSYLVANIA, ASSIGNOR TO BURNHAM, WILLIAMS & COMPANY, OF PHILADELPHIA, PENNSYLVANIA, A FIRM.

RADIAL-SWING TRUCK.

SPECIFICATION forming part of Letters Patent No. 735,626, dated August 4, 1903.

Application filed April 13, 1903. Serial No. 152,395. (No model.)

*To all whom it may concern:*

Be it known that I, BENJAMIN R. VAN KIRK, a citizen of the United States, residing in Philadelphia, Pennsylvania, have invented certain Improvements in Radial-Swing Trucks, of which the following is a specification.

My invention relates to a two-wheel radial-swing truck used especially under locomotives either in front or in the rear of the drivers.

While my invention is especially applicable to locomotives, it will be understood that it can be applied to other rolling-stock without departing from my invention.

The main object of my invention is to so arrange the pivot of the equalizing-beam that it can freely swing; and a further object of the invention is to so mount the two-wheel truck that the axle will assume a radial position or a position approximately radial in passing around curves of the track. These objects I attain in the following manner, reference being had to the accompanying drawings, in which—

Figure 1 is a longitudinal sectional view showing my improved truck. Fig. 2 is a plan view. Fig. 3 is a transverse section on the line 3 3, Fig. 1. Fig. 4 is a perspective view of one of the radius-bars, and Fig. 5 is a view of a modification.

In the present instance A is the frame of a locomotive, having a cross member A', which carries the equalizing-beam B and to which is connected the truck-frame D. The truck-frame consists of two side members $d\ d$, formed by plates and angle-irons connected by cross members $d'$. The truck has suitable guides for the boxes $c$, in which is mounted the axle E. On the axle are wheels $e\ e$. The truck D is connected to the cross member A' of the frame by radius-bars F F, made in the present instance as clearly shown in Fig. 4, having upper and lower parts $f\ f'$, connected by an upright $f^2$. The radius-bars are pivoted to the frame A' by pins $g$ and to the truck-frame by pins $g'$. The form of the radius-bars may be modified without departing from the main feature of my invention. The radius-bars are pivoted to the frame in the manner shown in Fig. 1, and it will be noticed that they converge in the same direction. The pivots $g$ in the present instance are nearer the center than the pivots $g'$. Owing to the convergence of the radius-bars lateral movement of the main frame A in respect to the truck-frame, such as will be caused when the locomotive or car is entering upon or leaving a curve of the track, would result in one of the bars pushing and the other pulling upon the truck-frame D, with the effect of swinging the same in a position radial in respect to the curve in the track.

B is the equalizing-beam, connected at one end by a stirrup $h$, hung from a cross-bar $h'$, suspended from springs H (one on each side of the truck) by means of stirrups $h^2$. These springs H bear upon the boxes $i$ for the driving-axle I. (Shown in Fig. 1.) The other end of the beam B is connected by a stirrup $c'$, hung from a spring C, which rests on blocks $c^2$, bearing upon the boxes $c\ c$ of the truck-frame D.

In place of the transverse spring shown in Figs. 1 and 2 coiled springs (shown in Fig. 5) may be used. These springs C' are mounted between the flanges of the cross-beams of the truck and blocks $d^2$, carried by yokes $d^3$, resting on the boxes $c$. The end of the beam B rests in a stirrup hung from a cross-bar on the frame.

Hung from a pivot-bolt $b$ on the beam B are two levers M M, one on each side of the beam, and connected to the trunnions $m$ of these levers are links N, which are in turn coupled to pins $a^3$ on the swivel-block $a$, carried by a bolt $a^2$, secured to the under side of the cross-beam A' of the main frame A, so that while the truck-frame D can move laterally and assume a radial position the beam B can move bodily to one side or the other by means of the lever-coupling and swivel-block.

By the arrangement above described I am enabled to pivot a two-wheel radial-swing truck under a locomotive or other rolling-stock, and the equalizing-beam will have freedom, so that the portion of the locomotive to which the equalizing-beam is secured can move to one side or the other of the center of the trucks and at the same time the truck will assume a radial position or a position approximately radial in passing around curves.

I claim as my invention—

1. The combination of a main frame, a truck-frame, boxes carried by said frame, an axle mounted in the boxes, a spring, an equalizing-beam, a swing-pivot for said beam, and connections between the truck-frame and the main frame, substantially as described.

2. The combination of a main frame of a locomotive or other rolling-stock, a truck, an equalizing-beam extending from the truck and forming part of the equalizing mechanism of the locomotive, with a swinging pivot for the said beam, substantially as described.

3. The combination of a main frame, an equalizing-beam, levers on the equalizing-beam, a pivoted block on the main frame, and links connecting the levers of the equalizing-beam to the block, substantially as described.

4. The combination of a beam forming part of the equalizing mechanism of a locomotive or other rolling-stock, a main frame, a block pivoted to the main frame, and pivoted levers on each side of the beam, with two sets of links coupling the levers to the block, substantially as described.

In testimony whereof I have signed my name to this specification in the presence of two subscribing witnesses.

BENJAMIN R. VAN KIRK.

Witnesses:
 WILL. A. BARR,
 JOS. H. KLEIN.